Aug. 14, 1951  E. E. SPAID  2,563,880
SAFETY FISHHOOK DEVICE
Filed May 17, 1945  4 Sheets-Sheet 1

Inventor

EUGENE E. SPAID

By Clarence A. O'Brien
and Harvey B. Jacobson
Attorneys

Aug. 14, 1951  E. E. SPAID  2,563,880
SAFETY FISHHOOK DEVICE
Filed May 17, 1945  4 Sheets-Sheet 2

Inventor

EUGENE E. SPAID

By Clarence A. O'Brien
and Harvey B. Jacobson
Attor

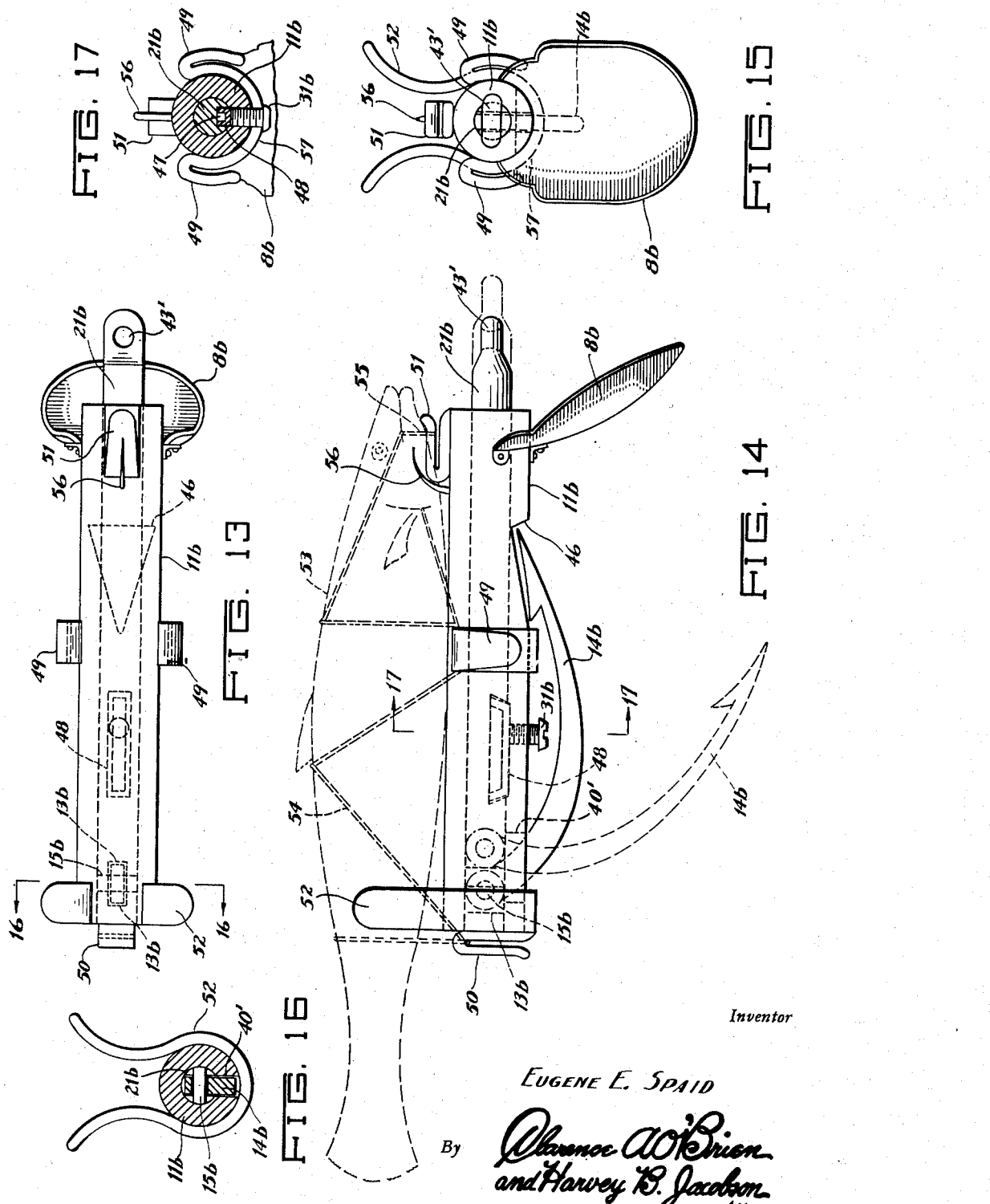

Aug. 14, 1951 E. E. SPAID 2,563,880
SAFETY FISHHOOK DEVICE
Filed May 17, 1945 4 Sheets-Sheet 4

Inventor
EUGENE E. SPAID
By Clarence A. O'Brien
and Harvey B. Jacobson
Attorneys Patented Aug. 14, 1951

2,563,880

UNITED STATES PATENT OFFICE 2,563,880

SAFETY FISHHOOK DEVICE

Eugene E. Spaid, Lake Bluff, Ill.

Application May 17, 1945, Serial No. 594,343

8 Claims. (Cl. 43—36)

1

This invention relates to a novel safety fish hook device or lure of that type in which at least one pivoted fish hook is normally disposed in a retracted position with its pointed end guarded so that the device may be safely carried and handled, and in which a draw bar for connection to the fishing line is operatively connected with the fish hook so as to project the latter and effectively catch the fish when the line is suddenly pulled after the device is taken by the fish.

The primary object of the present invention is to provide a device of the above kind in which adjustable friction means is provided for resisting movement of the draw bar relative to its support, whereby a predetermined resistance to movement of the support and a sudden jerk on the draw bar are necessary to cause projection of the fish hook to impaling position.

Another object of the present invention is to provide a device of the above kind embodying a pair of oppositely movable, horizontally swinging fish hooks and a single vertically swinging fish hook that is swung downwardly to projected position, and simple and efficient means for operatively connecting the draw bar with all of said fish hooks.

Another object of the invention is to provide a device of the above kind embodying at least one vertically swinging fish hook that is adapted to be swung downwardly to projected position, a member having a slot, and a draw bar connected with the pivoted end of the fish hook for moving said pivoted end relative to the slotted member, said fish hook extending through the slot of the slotted member so as to cause retraction and projection of the fish hook respectively upon rearward and forward movement of the draw bar relative to the slotted member.

Still another object of the invention is to provide a device of the above kind which is comparatively simple and durable in construction and otherwise well adapted to meet with the requirements for successful commercial use.

Other and more specific objects and features of the invention will become apparent from the following description when considered in connection with the accompanying drawings.

2

Figure 1:
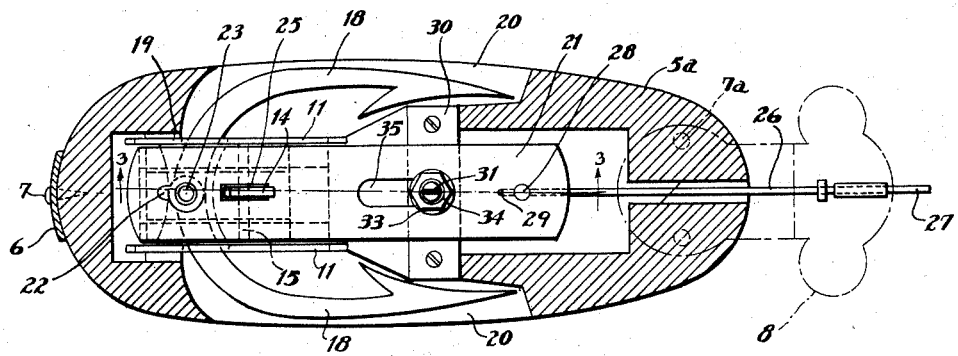
Figure 1 is a view, partly in top plan and partly in horizontal section, of a device constructed in accordance with the present invention, with the hooks retracted.
Figures 3, 4:
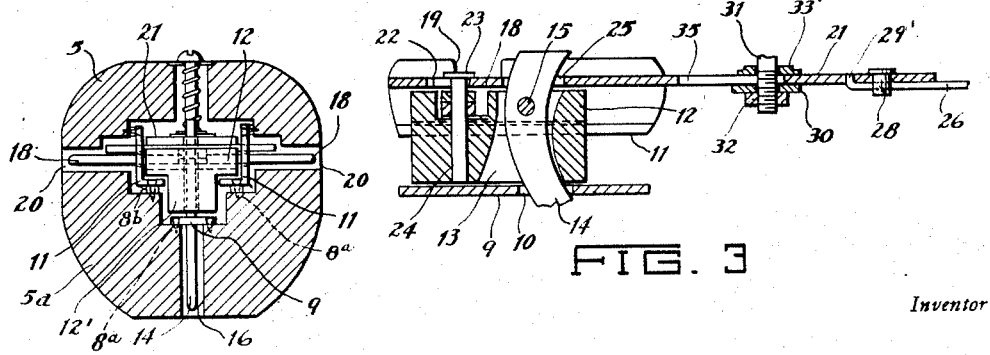

Figure 3 is a fragmentary longitudinal section taken on line 3—3 of Figure 1, with the body of the lure omitted.

Figure 4 is a view of the device shown in Figure 1, partly in end elevation, as seen looking toward the right of Figure 1, and partly in transverse section.

Figure 5:
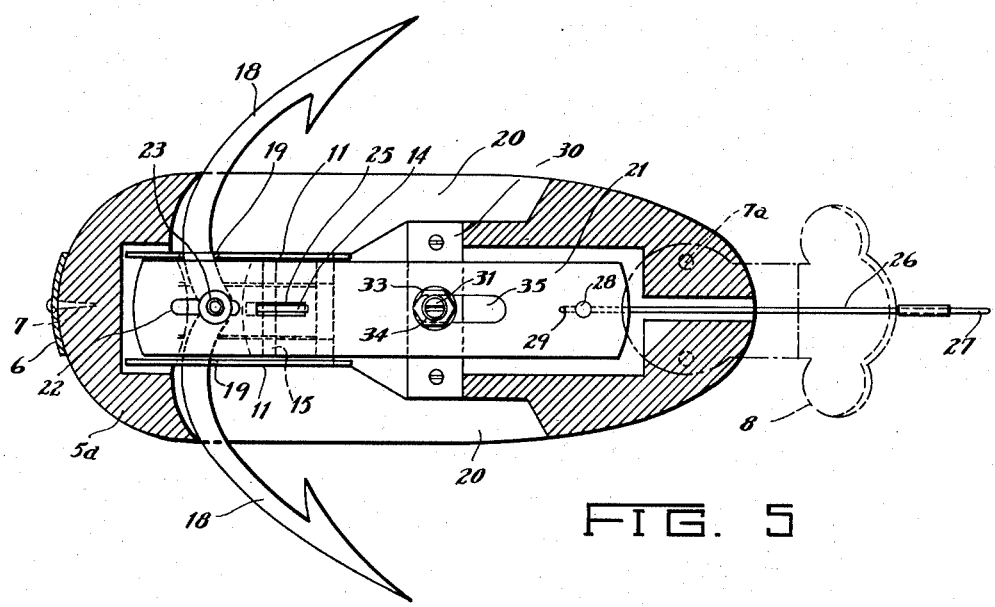

Figure 5 is a view similar to Figure 1 with the hooks in projected position.

Figure 2:
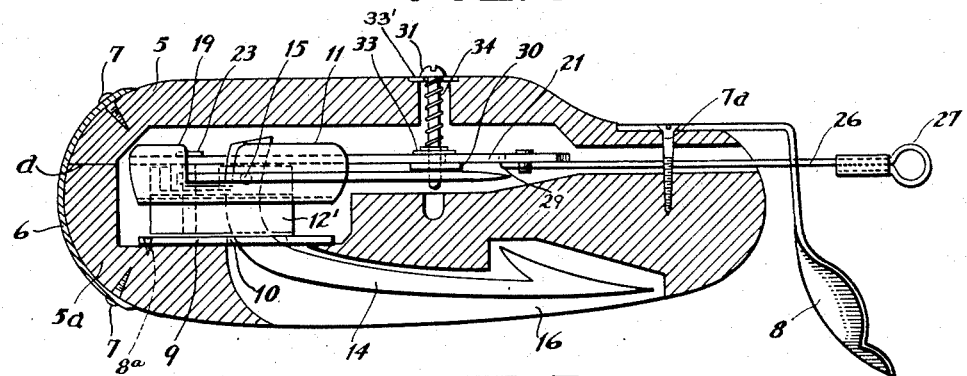
Figure 2 is a view of the construction shown in Figure 1, partly in central longitudinal section and partly in side elevation.
Figure 6:
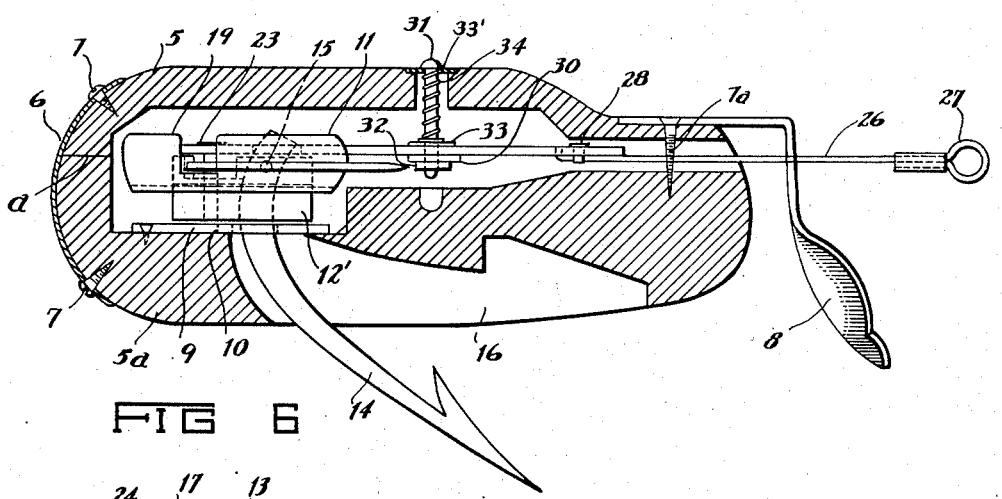

Figure 6 is a view similar to Figure 2 with the hooks in projected position.

Figure 7:
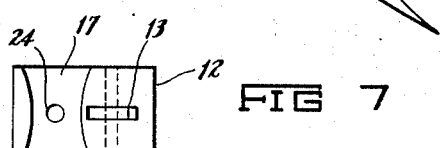
Figures 7A, 7B:
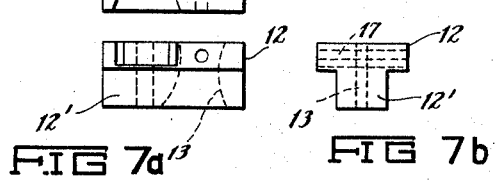

Figures 7, 7a and 7b are respectively top plan, side elevational and end elevational views of the carriage forming part of the device shown in Figure 1 and to which the fish hooks are pivoted.

Figure 8:
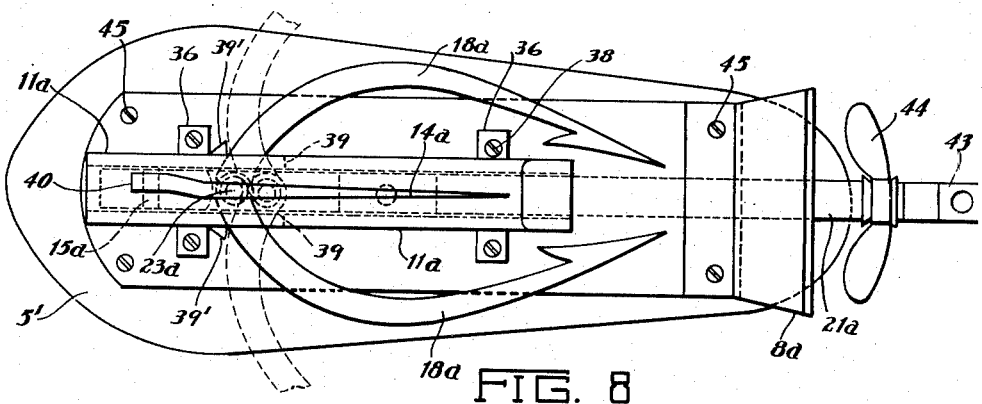

Figure 8 is a bottom plan view of another form of the invention.

Figure 9:
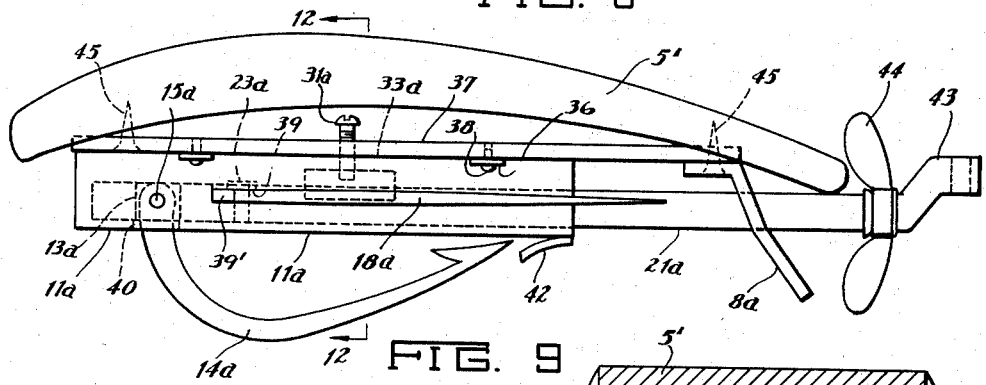

Figure 9 is a side elevational view of the construction shown in Figure 8.

Figure 10:
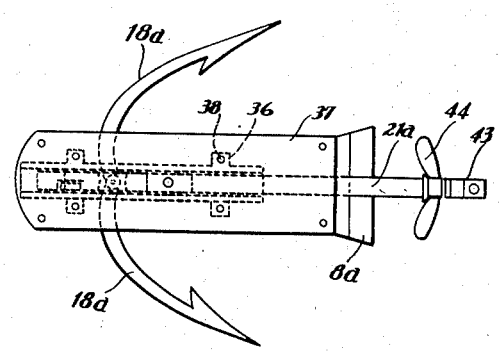

Figure 10 is a top plan view, drawn on a reduced scale, and showing the device of Figure 8 with parts omitted and with the hooks projected.

Figure 11:
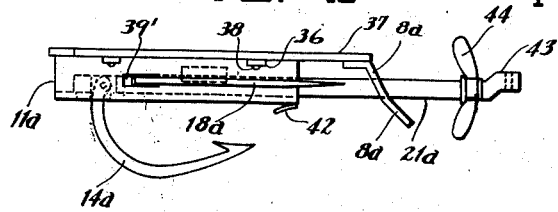

Figure 11 is a side elevational view of the construction as shown in Figure 10.

Figure 12:
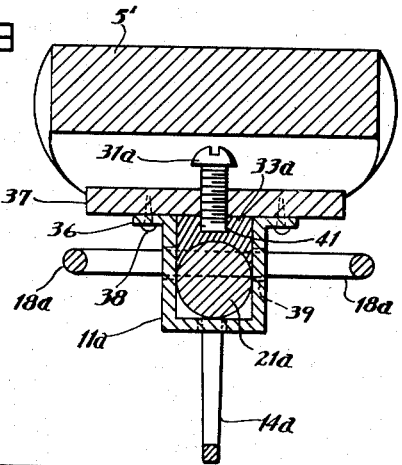

Figure 12 is a transverse section taken on line 12—12 of Figure 9.

Figure 13 is a top plan view of still another form of the present invention

Figure 14 is a side elevational view of the device shown in Fig. 13.

Figure 15 is a front elevational view thereof.

Figure 16 is a transverse section taken on line 16—16 of Figure 13.

Figure 17 is a transverse section taken on a portion of line 17—17 of Figure 14.

The device shown in Figures 1 to 7b, inclusive, is a lure in the form of an artificial bait embodying a wood or other body divided along the line a into an upper section 5 and a lower section 5a. These sections are secured together by suitable means; which may include a metal strap 6 fastened to the respective sections at the rear end of the body, as at 7. The sections are shown secured together at the front end of the body by means of screws 7a that are also used to secure an action plate 8 on the front end of the body. This action plate may be of any desired form for giving the lure a wobbling or other motion when drawn through the water.

Secured by screws or the like, as at 8a, within suitable mating recesses provided in the adjacent faces of the body sections 5 and 5a is a fish hook device including a stationary plate 9 provided with a slot at 10. Provided in the body above the plate 9 are spaced guides or guide rails 11 of angular form in cross section, as shown in Figure 4. These guide rails are secured by screws or the like in a fixed position, spaced from and disposed longitudinally on the body, with washers 8b surrounding the screws 8a and between the guide rails 11 and body 5a. A carriage 12 is slidably disposed between the rails 11 and upon the lower horizontal flanges of the latter, said carriage having a reduced lower portion 12' depending between and below the rails 11 into proximity with the plate 9. As shown in Figures 3 and 7b, the carriage 12 is of T-shape in end elevation and has a flared opening 13 formed through its forward end portion in a vertical direction. Freely extending through the slot 10 of plate 9 and through the opening 13 of carriage 12 is the curved inner or rear end portion of a hook member 14, which end portion is pivoted to the carriage 12, as at 15, upon a transverse horizontal axis. The hook member is thus mounted to swing in a vertical plane, and the lower section 5a of the body is formed with a bottom recess 16 to receive the hook member 14 when the latter is swung upwardly to retracted position, as shown in Figure 2. When in this position, the hook member 14 is effectively guarded, although said hook member is adapted to swing downwardly to projected operative position out of the recess 16, as shown in Figure 6. Carriage 12 is also formed in the upper portion of its rear end with a transverse flared recess or groove 17, and pivoted within this recess or groove are the curved inner or rear ends of a pair of similar hook members 18. Hook members 18 extend from the carriage 12 outwardly through slots or notches 19 provided in the vertical flanges of guide rails 11, and the arrangement is such that the hook members 18 may be swung inwardly to guarded and retracted position within recesses 20 of the lure body, as shown in Figure 1, or outwardly from said recesses to projected operative position, as shown in Figure 5.

The device includes a draw bar embodying a flat elongated plate 21 having forward and rear end portions and slidably disposed longitudinally of and between the body sections 5 and 5a, the rear end portion of said plate being slidably disposed upon the carriage 12 between the vertical flanges of guide rails 11. The rear end of plate 21 has a longitudinal elongated slot 22 through which extends the shank of a headed pin 23 that forms the pivot for the hook members 18 and extends through the overlapped ends of the latter and is secured in an opening 24 of the carriage 12. The forward end of the drawbar is connected to and movable with the rear end provided with the slot. This construction allows limited sliding movement or lost motion of plate 21 relative to hook members 18 and carriage 12, whereby plate 21 can move slightly and gain speed to sharply impact pin 23 and quickly project hook members 18. The pivoted end of hook member 14 projects above the pivot 15 through a slot 25 provided in the plate 21 forwardly of the slot 22. The arrangement is such that when the hook members are retracted, as shown in Figures 1 and 2, forward movement of plate 21 will cause engagement of the rear walls of slots 22 and 25 respectively and consecutively with the pivot pin 23, and the projecting end portion of hook member 14 to give a further lost motion before pivoting of the latter hook member. Continued forward movement of plate 21 will then effect outward swinging or projection of the hook members to the positions shown in Figures 5 and 6, due to engagement of the hook member 14 with the forward end wall of slot 10 in plate 9 and engagement of the hook members 18 with the forward walls of the slots or notches 19 of rails 11, the pivoted ends of the hook members being shifted forwardly with the carriage 12 relative to plate 9 and rails 11. Rearward movement of plate 21 will cause a reverse of this operation so as to swing the hook members inwardly to retracted position, the rear walls of the slots 10, 22 and 25 and of the slots or notches 19 then coming into play. As shown, the draw bar also includes a pull rod or wire 26 extending into the forward end of the body and having its rear end connected to the forward end of plate 21, the forward projecting end portion of rod or wire 26 being formed with a terminal eye 27 to facilitate attachment of the fishing line thereto. As shown, the rear end of wire or rod 26 extends through an opening of a pin 28 beneath the forward end of plate 21, and has an upturned terminal 29 projecting into an opening of the plate 21 rearwardly of the pin 28. Pin 28 is secured to and projects through the plate 21, as clearly shown in Figure 3.

Secured to the lower body section 5a beneath the plate 21 and forwardly of the guide rails 11 is a transverse plate 30 through which extends the lower end of an adjusting screw 31 that also extends upwardly through the upper body section 5 and has its head exposed at the top of the latter. A nut member is suitably restrained against rotation and disposed beneath the plate 30 at 32, and the lower end of adjusting screw 31 has threaded engagement in this nut member. Loosely disposed on the screw 31 and upon the plate 21 is a friction disc or plate 33, and encircling the screw 31 between a washer 33', placed on said screw adjacent the head of the latter, and the disc 33 is a compression spring 34, the tension of which may be adjusted by threading the screw 31 downwardly or upwardly relative to the nut member 32. In this way, the frictional engagement of disc 33 with plate 21 may be regulated so as to vary the resistance offered to movement of plate 21 relative to the body of the lure. In this way, accidental projection of the hook members is prevented, and a predetermined resistance to movement of the body and a sudden pull on the draw bar is required to project the hook members, commensurate with the type of fishing being done. Screw 31 extends through an elongated slot 35 of plate 21 so that the longitudinal movement of the draw bar is properly limited to insure disposition of the hook members in outwardly and forwardly extending position when fully projected.

The embodiment of the invention shown in Figures 8 to 12, inclusive, comprises an elongated channel-shaped guide 11a having lateral ears 36 at the top thereof. This guide 11a is secured to the underside of a relatively large plate 37 by means of screws 38 passing through the ears 36 into said plate 37. Thus, the plate 37 covers the guide 11a at the top. Slots 39 are provided in opposite sides of the guide 11a and in transverse alignment, while another slot 40 is provided in the bottom of guide 11a rearwardly of the slots 39, for a purpose which will presently become apparent.

Longitudinally slidable in the guide 11a is a draw bar 21a recessed to receive the overlapped inner ends of hook members 18a that are pivoted in the recess at 23a the recess of draw bar 21a corresponding to the recess 17 of carriage 12 in the form of Figures 1 to 7b inclusive. Rearwardly of this recess, the draw bar 21a is formed at 13a with a vertical slot 13a corresponding to the slot 13 of carriage 12. A vertically swinging hook member 14a has its inner end pivoted within the slot 13a at 15a. The hook members 18a project outwardly through the slots at 39, while the hook member 14a projects downwardly through the slot at 40. The arrangement is such that when the draw bar 21a is moved forwardly relative to guide 11a, the hook members 14a and 18a are swung outwardly to the projected positions of Figures 10 and 11, and when the draw bar 21a is moved rearwardly relative to guide 11a, said hook members are swung inwardly to retracted position, as shown by full lines in Figures 8 and 9. Of course, the hook member 14a swings vertically and extends beneath the bottom of the guide 11a, while the hook members 18a swing horizontally and extend forwardly beside the guide 11a.

Disposed within the guide 11a and upon the draw bar 21a is a friction block 33a, and threaded through the plate 37 and loosely engaged in a recess 41 provided in the top of block 33a is an adjusting screw 31a. By threading the screw 31a upwardly or downwardly, the frictional engagement of block 33a with draw bar 21a may be adjusted to offer the desired resistance to movement of said draw bar relative to guide 11a. In this way, accidental movement of the draw bar and projection of the hook members may be prevented, and by a predetermined resistance to movement of the guide, a sudden pull on the draw bar is required to project the hooks, commensurate with the type of fishing being done. When draw bar 21a is pulled forwardly, the pivoted ends of the hook members move therewith and the forward end walls of slots 39 and 40 engage the hook members to swing them outwardly. Upon rearward movement of the draw bar, the hook members are engaged by the rear walls of the slots 39 and 40 so as to cause the hook members to swing inwardly to retracted position. A suitable guard plate 42 may be secured to the under side of the guide 11a at the forward end of the latter so as to effectively shield the pointed end of the hook member 14a when in retracted position, as shown in Figure 9.

A suitable action plate 8a may be secured to the under side of the forward end of plate 37, said plate 37 projecting beyond the forward end of the guide 11a, as shown in Figure 9. The plate 8a may be designed to cause the desired wobbling or other movement of the lure when drawn through the water, and it is disposed forwardly of the hook members 18a so as to shield the points of the latter when said hook members are in retracted position. Draw bar 21a preferably has an upwardly offset apertured forward end portion 43 to which the fishing line is adapted to be attached, and directly behind this offset portion of draw bar 21a a spinner 44 may be journaled on the latter.

As shown, the plate 37 is attached to the under side of a longitudinally arched elongated body 5', by means of screws 45 passing through the plate 37 and into said body 5'. The body 5' is of suitable contour and forms the attractive body of the lure. Certain of the screws 45 may be used to also attach the action plate 8a to the plate 37, as shown. Body 5' projects forwardly beyond the front end of plate 37 and terminates directly behind the spinner 44, the action plate 8a being disposed in forwardly inclined position beneath the forward end of the body 5'. Stop lugs 39' for limiting projection of the hook members 18a are provided on the outside of guide element 11a at the rear of the slots 39.

The form of the invention shown in Figures 13 to 17, inclusive, embodies a tubular guide 11b having a slot 40' formed in the bottom thereof near the rear end of the same. Slidably fitted in and projecting from the forward end of the guide 11b is a draw bar 21b provided with an apertured forward end 43' to facilitate attachment of the fishing line thereto. Near its end, the draw bar 21b is provided at 13b with a vertical slot within which is pivoted the inner end of a hook member 14b, as at 15b. The arrangement is such that when the draw bar 21b is moved forwardly relative to guide 11b, the hook member 14b will engage the forward end of slot 40' and said hook member will be caused to swing downwardly to the projected position indicated by dotted lines in Figure 14. On the other hand, when the draw bar 21b is moved rearwardly relative to guide 11b, the rear wall of slot 40' will engage the hook member 14b so as to cause the latter to be swung upwardly to retracted position, as shown by full lines in Figure 14. The guide 11b preferably has a notch 46 in the under side thereof to receive the pointed end of hook member 14b when the latter is in retracted position, thereby effectively guarding such pointed end.

Arranged within a recess 47 of draw bar 21b is a friction element body 48 which is engaged by an adjusting screw 31b threaded upwardly through the bottom of guide 11b forwardly of the pivoted end of hook member 14b. By adjusting the screw 31b, its frictional engagement with the spring or block 48 may be adjusted so as to offer a predetermined resistance to movement of draw bar 21b relative to guide 11b. In this way, accidental projection of the hook member 14b may be prevented and a predetermined resistance to movement of the guide and a sudden pull upon the draw bar are necessary for causing projection of the hook member 14b, commensurate with the type of fishing being done. Attached to and extending forwardly and downwardly from the forward end of guide 11b is a suitable action plate 8b.

The guide 11b may be attached to the under side of any suitable kind of natural or artificial bait. As shown, means is provided for effectively anchoring the bait upon the guide 11b longitudinally of the latter. This means includes lacing clips 49 attached to and disposed at opposite sides of the guide 11b intermediate its ends, and other lacing clips 50 and 51, respectively attached to the rear end and upon the forward end of the guide 11b. In addition, a U-shaped clip 52 embraces and is secured to the rear end portion of guide 11b and includes resilient end portions projecting above said guide to grip the rear end of the body of the bait disposed longitudinally upon the guide 11b, as indicated by dotted lines at 53 in Figure 14. A suitable length of cord 54 is laced around the clips 49 and 50 and about the body of the bait to secure it upon the guide 11b and in engagement with the clip 52. The same piece of cord may be passed about the lower jaw of the bait, as indicated at 55, and engaged with the clip 51 to secure the head of the bait upon the guide. An upwardly and forwardly projecting pointed prong 56 may also be provided upon the forward end of guide 11b so as to impale the head of the bait and more effectively secure the latter in place. As shown, the clips 49 are formed on the ends of a U-shaped member 57 partially embracing and secured to the guide 11b.

It will, of course, be understood that the body of the device may take any one of many different forms and kinds, those shown being merely illustrated by way of example. Use of the action plates and the spinner is also optional. In every instance, however, there is at least one swinging hook member operatively connected in a generally similar way to a draw bar and operatively associated in a similar way with the slot of a guiding element. Such guiding element is afforded by the pair of guide rails such as member 11 and plate 9 in the form of the invention shown in Figure 1. In addition, each form of the invention includes adjustable friction means for providing predetermined resistance to movement of the draw bar relative to the guiding element. The device is comparatively compact and simple in construction, has been found to operate efficiently in use, and is comparatively safe to carry and handle with the hooks in retracted position. Even after the device is taken by the fish, it may be forced rearwardly slightly and then the draw bar may be actuated to retract the hook or hooks so that the device might be withrdrawn from the fish without undue mutilation or injury to the latter. This is important when the device has been taken by an undersized fish and it is desired to return the fish to the water in a live and comparatively uninjured condition.

What I claim is:

1. In a safety fish hook device, the combination of a body having a member therein provided with a slot, a draw bar for attachment to a fishing line movable relative to said member, a part having a lost motion connection with and movable with said draw bar, said part being disposed above the slot of said member and provided with a vertical slot, a vertically swinging hook member pivoted at its inner end to said part within the vertical slot of the latter and projecting downwardly through the slot of said member, the front and rear walls of the slot of said member coacting with the hook member to cause projection and retraction of the latter respectively upon forward and rearward movement of the draw bar and said part relative to said member, and manually adjustable friction means acting upon said draw bar so as to offer such predetermined resistance to movement of the latter relative to said member that a sudden jerk on the fishing line is required to project the hook member.

2. In a safety fish hook device, the combination of an elongated body, spaced longitudinal guide rails secured in the body and having vertical flanges provided with transversely aligned slots, a carriage slidable on said guide rails and provided with a top recess and a vertical slot in front of said recess, a draw bar member adapted for connection with a fishing line and slidably disposed upon said carriage between said guide rails, a pair of oppositely swinging horizontally movable hook members retractible within and projectible outwardly from the body, said hook members being pivoted at their inner ends within the recess of the carriage and projecting outwardly through the slots of the guide rails, said draw bar member being connected with the carriage and having a slot, a slotted plate mounted in the body beneath the carriage, a vertically swinging hook member pivoted at its inner end within the vertical slot of the carriage and projecting downwardly through the slot of said plate for retraction within and projecting downwardly from the body, said last-named hook member being extended at its pivoted end upwardly through the slot of the draw bar, and means connecting the draw bar with the carriage.

3. The construction defined in claim 2, wherein the draw bar member has an elongated slot, and wherein the pivot of the first-named hook members passes through said slot to allow limited movement of the draw bar relative to the carriage.

4. The construction defined in claim 2, in combination with a friction plate engaging the draw bar, a spring urging said friction plate against the draw bar, and an adjusting screw for regulating the strength of said spring and the frictional engagement of the friction plate with the draw bar.

5. In a safety fish hook device, the combination of a body having a channel-shaped guide element provided with a slot in the bottom thereof and provided with transversely aligned slots in opposite sides of the same forwardly of the first-named slot, a draw bar movable in the guide element and provided with a top recess and a vertical slot, horizontally swinging hook members pivoted at their inner ends within the recess of the draw bar and projecting outwardly through the second-named slots of the guide element, and a vertically swinging hook member pivoted at its inner end within the vertical slot of the draw bar and projecting downwardly through the first-named slot of the guide element, said hook members coacting with the end walls of the slots of said guide element so that the latter causes projection and retraction of the hook members respectively upon forward and rearward movement of the draw bar relative to the guide element.

6. In a safety fish hook device, the combination of a body having a guide element provided with a slot, a substantially rigid draw bar movable in said guide element and adapted to be attached to a fishing line, said drawbar being movable solely along an axis parallel to the axis of said guide element, a pivoted hook member movable at its pivoted end by and with the draw bar, said hook member projecting from its pivot outwardly through said slot of the guide element, the end walls of said slot coacting with said hook member to project and retract the latter respectively upon forward and rearward movement of the draw bar relative to the guide element, and friction means adjustable for offering variable predetermined resistance to longitudinal movement of the draw bar relative to the guide element so that a sudden jerk of predetermined strength on the fishing line is required to project the hook member.

7. In a safety fish hook device, the combination of a body having a guide element provided with a slot, a substantially rigid draw bar movable in said guide element and adapted to be attached to a fishing line, said drawbar being movable solely along an axis parallel to the axis of said guide element, a pivoted hook member movable at its pivoted end by and with the draw bar, said hook member projecting from its pivot outwardly through said slot of the guide element, the end walls of said slot coacting with said hook member to project and retract the latter respectively upon forward and rearward movement of the draw bar relative to the guide element, and manually adjustable friction means acting upon said draw bar and adjustable to offer variable predetermined resistance to longitudinal movement of the latter relative to the guide element so that a sudden jerk of predetermined strength on the fishing line is required to project the hook member.

8. A body having a member therein provided with a slot, a second member provided with a supporting means, a drawbar slidably secured to said supporting means and having line attaching means at one end thereof and a part above said slot, said part provided with a slot, a member interposed between the drawbar and the first mentioned member, a hook having a shank pivoted on the last interposed member and having portions thereof extending through both slots, the length of the slots being slightly longer than the width of the shank of the hook so that movement of the slidable member will cause the ends of its slot to engage the hook to move it about its pivot, and brake means on the second member engageable with the drawbar to frictionally resist movement of the drawbar relative to the first member.

EUGENE E. SPAID.

REFERENCES CITED

The following references are of record in the file of this patent:

UNITED STATES PATENTS

| Number | Name | Date |
| --- | --- | --- |
| 362,183 | Runyon | May 3, 1887 |
| 570,344 | Smith | Oct. 27, 1896 |
| 707,683 | Farwell | Aug. 26, 1902 |
| 729,435 | Smith | May 26, 1903 |
| 820,581 | La Londe | May 15, 1906 |
| 828,509 | Rounsburg | Aug. 14, 1906 |
| 891,800 | Enrico | June 23, 1908 |
| 1,076,036 | Hepner et al. | Oct. 21, 1913 |
| 1,172,881 | Dodge et al. | Feb. 22, 1916 |